US008700566B2

(12) United States Patent
Bristol et al.

(10) Patent No.: US 8,700,566 B2
(45) Date of Patent: Apr. 15, 2014

(54) OFFLINE RESTRUCTURING OF DEDB DATABASES

(75) Inventors: Larry J. Bristol, Bellville, TX (US); Bruce H. Mansur, Dripping Springs, TX (US); William P. Kimball, Houston, TX (US); Thomas E. Simms, Sugar Land, TX (US)

(73) Assignee: BMC Software, Inc., Houston, TX (US)

( * ) Notice: Subject to any disclaimer, the term of this patent is extended or adjusted under 35 U.S.C. 154(b) by 342 days.

(21) Appl. No.: 12/563,637

(22) Filed: Sep. 21, 2009

(65) Prior Publication Data

US 2011/0071982 A1 Mar. 24, 2011

(51) Int. Cl.
*G06F 17/30* (2006.01)

(52) U.S. Cl.
USPC .......................................... 707/610; 707/619

(58) Field of Classification Search
USPC ......... 707/610, 613, 615, 616, 619, 640, 655, 707/658, E17.005, 999.204
See application file for complete search history.

(56) References Cited

U.S. PATENT DOCUMENTS

| 5,991,761 | A | 11/1999 | Mahoney et al. |
| 6,691,121 | B1 | 2/2004 | Heronimus et al. |
| 7,809,762 | B1 * | 10/2010 | Parker et al. ................. 707/802 |
| 2003/0135478 | A1 * | 7/2003 | Marshall et al. ................. 707/1 |
| 2005/0240638 | A1 * | 10/2005 | Fisher .......................... 707/205 |
| 2008/0307429 | A1 * | 12/2008 | Fontaine et al. ............. 719/312 |

OTHER PUBLICATIONS

IBM, IMS V12 Database Administration, May 2012 pp. 1-2, http://pic.dhe.ibm.com/infocenter/dzichelp/v2r2/topic/com.ibm.ims12.doc.dag/ims_addsecindex_existingdedb.htm.*

* cited by examiner

*Primary Examiner* — Ajay Bhatia
*Assistant Examiner* — Randall Burns (57) ABSTRACT

An IMS DEDB database restructure operation creates an empty offline DEDB having the desired structure. The offline database is populated with data from a source (online) database while keeping the source database online (i.e., available for access and update operations). Updates to the source database made during this process are selectively processed in parallel with the offline DEDB load operation. When the contents of the offline database is substantially the same as the source or online database, the source database is taken offline, final updates to the offline database are applied whereafter the offline database is brought online, thereby replacing the source database. It is significant to note that updates occurring to the source or online DEDB are applied to the offline DEDB.

20 Claims, 7 Drawing Sheets

| UOW1 | UOW2 | UOW3 | UOW4 | UOW5 | UOW6 |
|------|------|------|------|------|------|
| UOW7 | UOW8 | UOW9 | ... | | UOW( JxK ) |

OFFLINE RESTRUCTURING OF DEDB DATABASES

BACKGROUND

The invention relates generally to database and database management system operations. More specifically, the invention relates to updating an offline IMS Fast Path DEDB database.

The IBM Information Management System (IMS) is a joint hierarchical database and information management system. There are three basic forms of IMS databases: (1) Full Function; (2) High Availability Large Databases; and (3) Fast Path. Full function databases can have both primary and secondary indexes, employ a variety of access methods and can store data using Virtual Storage Access Methods (VSAM) or Overflow Sequential Access Methods (OSAM). High Availability Large Databases are an extension of IMS Full Function databases and were introduced to provide better availability, handling of extremely large data volumes and online reorganization to support continuous availability.

Fast Path databases were designed to be continuously online and are optimized for extremely high transaction rates. That is, Fast Path databases are functionally focused on data acquisition or capture rather than query response. Fast Path databases do not support indexes and, for the most part, are implemented using Data Entry Databases (DEDBs). Fast path DEDBs can only be built atop VSAM and are direct-access databases that consist of one or more areas, with each area containing both root segments and dependent segments.

While DEDBs are designed to be continuously available, there are times when one must be taken offline. For example, structural changes in a DEDB's schema can only be made to an offline database. While offline, however, there is currently no mechanism to update a DEDB. Thus, if a DEDB is to be modified it must currently be made unavailable to users. The time required to make structural changes may be large and the concomitant loss of access to the database can pose a heavy financial burden on the database's owner. Thus, it would be beneficial to provide a means to restructure a DEDB database while it is offline.

SUMMARY

In one embodiment the invention provides a method to restructure an online IMS DEDB database. The method includes identifying the structure of the online DEDB that is to be restructured. An offline DEDB is then instantiating having the desired structure and data from the online DEDB is copied into it. Modifications to the online DEDB occurring during the act of copying data from the online to offline DEDB are identified and applied to the offline DEDB. Once fully populated with data, the offline DEDB is then swapped for the online DEDB and, itself, taken online. The result is a DEDB having the desired structure and all of the original online DEDB's information.

In another embodiment, a computer executable program to implement the aforementioned method may be stored in any tangible media that is readable and executable by a computer system. In yet another embodiment, a networked computer system may be programmed so that, collectively, all of the computer systems comprising the network of computers perform the aforementioned method.

DETAILED DESCRIPTION

In general, the invention relates to database management operations. More particularly, the invention relates to IMS database operations in which an online DEDB database may be restructured by updating an offline DEDB database with minimal loss of user access time. Examples of IMS DEDB modifications that necessitate a restructure operation include, but are not limited to: increasing or decreasing the number of areas in a database; changing the number of units of work (UOW) contained within an area; changing a database's block size; adding a new segment; increasing a database's maximum segment size; decreasing a database's minimum segment size; changing a database's randomizer function; and changing a database's storage format.

In general, restructure operations in accordance with the invention create an empty, offline DEDB having the desired structure. The offline database is then populated with data from the source (online) database while keeping the source database online (i.e., available for access and update operations). Updates to the source database made during this process are selectively processed in parallel with the offline DEDB load operation. When the contents of the offline database are substantially the same as the source or online database, the source database is taken offline, final updates to the offline database are applied whereafter the offline database is brought online, thereby replacing the source database. It is significant to note that updates occurring to the source or online DEDB are applied to the offline DEDB.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of IMS database design, maintenance and operation having the benefit of this disclosure. Accordingly, the claims appended hereto are not intended to be limited by the disclosed embodiments, but are to be accorded their widest scope consistent with the principles and features disclosed herein.

As a preliminary matter, it is noted that DEDBs may be accessed and updated through one or more IMS database management systems (DBMSs). It is further noted that one or more IMS DBMSs may be grouped into a functional collection referred to as an IMSPlex. It is known in the field of IMS development that an IMSPlex provides mechanisms (e.g., common memory and data) by which events occurring in a first IMS DBMS may be made known to another IMS DBMS.

In general, restructure operations in accordance with the invention may be made to a selected DEDB while it is being updated through a plurality of DBMSs. For simplicity and clarity of exposition, however, a first embodiment will be described in which a source or online DEDB is being updated by a single IMS DBMS wherein both the source DEDB and an offline restructure operation in accordance with the invention are members of an IMSPlex. Additional discussion, following this initial embodiment, will expand on the principles set forth immediately below.

Figure 1:
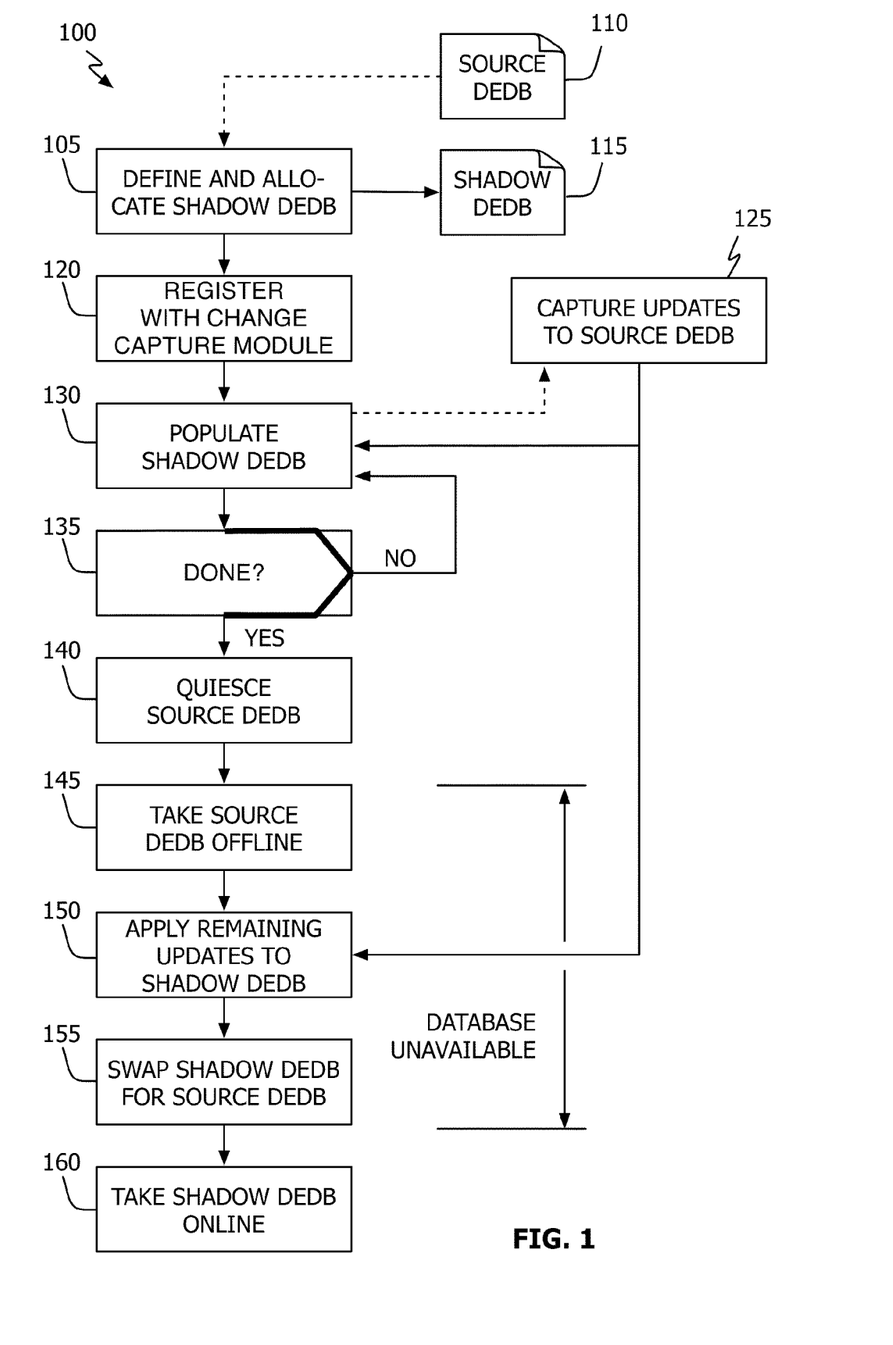
FIG. 1 shows, in flowchart form, an IMS DEDB update method in accordance with one embodiment of the invention.

Referring to FIG. 1, offline restructure operation 100 in accordance with one embodiment of the invention begins by defining one or more changes that are to be made to a currently online DEDB and then allocating the database so defined (block 105). As used herein, the "currently online" database will be referred to as the "source" database (110) and the DEDB allocated in accordance with block 105 will be referred to as the "shadow" database (115). In practice, the structure of source database 110 is often used as a starting point from which to define the structure of shadow database 115. After allocation, storage space for shadow database 115 will have been set aside or made available for use, but will be void of data.

Once shadow database 115 has been allocated, source database 110 is registered with the IMS DBMS' change capture module so that it will record all updates to the source database and forward the same to offline restructure operation 100 (block 125), the details of which will be described below in connection with FIG. 2. (As used herein, the "change capture module" refers to that capability or function invoked by the IMS CHANGE-CAPTURE-EXIT.)

Once operations in accordance with block 120 complete, population of shadow database 115 with data from source database 110 begins (block 130). Because updates to source database 110 can occur during the act of populating shadow database 115, a check is made to determine if such updates have occurred (block 135). If more than a "sufficiently small" number of updates await to be applied to shadow database 115 (the "NO" prong of block 135), the pending updates are applied to shadow database 115 in accordance with block 130. If a "sufficiently small" number of updates have occurred (the "YES" prong of block 135), source database 110 is quiesced (block 140) and taken offline (block 145). To be "DONE" in accordance with block 135 means that all of UOWs from source database 110 have been copied into shadow database 115 and that a sufficiently small number of updates await to be applied to shadow database 115. Once offline, any remaining source database updates may be applied to shadow database 115 (block 150), after which shadow database 115 may be swapped for source database 110 (block 155) and then taken online (block 160). The result of which is a "new" online database having the desired structure and the data of "old" source database 110 (including updates made to source database 110 during the restructure operation).

As used herein, the phrase "sufficiently small" means that the number of updates are small enough that they may be applied to shadow database 115 within a specified time (i.e., during acts in accordance with block 150). In one embodiment, the specified time may be set such that the amount of time access is denied to the database (i.e., the time it takes to perform blocks 145-155) is less than some acceptable value. For example, if the time it would take to apply the remaining updates to shadow database 115 is such that the time to perform all acts in accordance with blocks 145-155 is less than 5 minutes, the "YES" prong of block 135 is taken. In another embodiment the "specified time" may be defined in terms of the number of updates that need to be applied. For example, if fewer than 1,000 updates remain to be applied to the offline shadow database, the "YES" prong of block 135 is taken.

As described above, the time users are prevented from initiating transactions against a target database in accordance with the invention may be made arbitrarily small by specifying what constitutes a "sufficiently small" number of updates during block 135. Thus, operations in accordance with the invention can restructure an online DEDB by updating an offline DEDB in parallel with continued use of the online DEDB. As a consequence, transaction processing against a target database may be interrupted far less than possible using prior art techniques. As noted previously, this result is provided in part by the ability to apply updates from an online DEDB to an offline DEDB—a capability not provided in the prior art.

Figure 2:
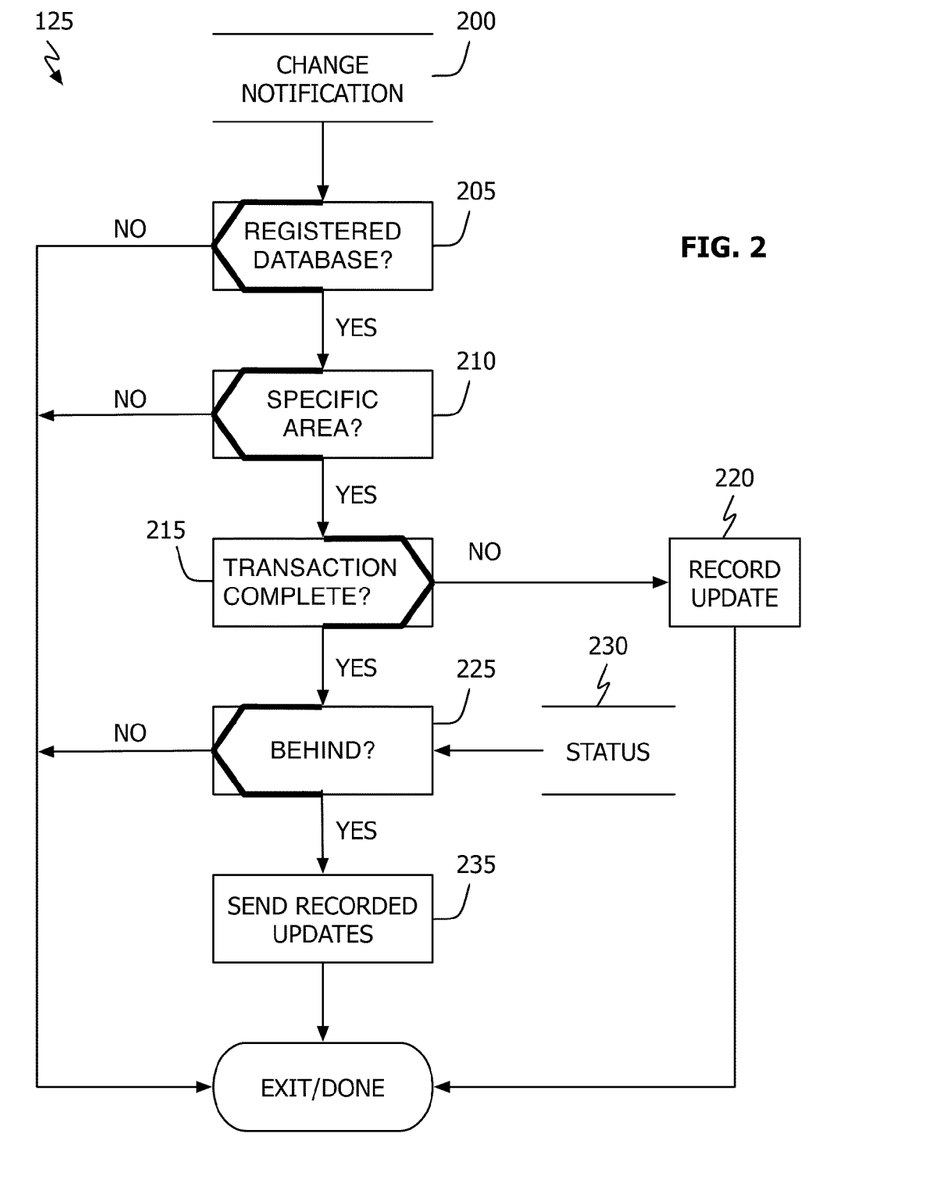
FIG. 2 shows, in flowchart form, a change capture process in accordance with one embodiment of the invention.

In one embodiment of the invention, acts in accordance with block 125 are performed by a change capture module as illustrated in FIG. 2. When an update to online database 110 is performed, that change is communicated to the changing DBMS' change capture module via the IMS CHANGE-CAPTURE-EXIT (block 200). A check is then made to determine if the update is associated with a database that has been registered with the change capture module in accordance with block 120 (block 205). If the update is not directed to the database being restructured—e.g., source database 110 (the "NO" prong of block 205), no further processing is needed and the change capture module exits. If the update is directed to the database being restructured (the "YES" prong of block 205), a further check is made to determine if the update is directed to a specific DEDB area(s) of source database 110 that is being restructured. While restructure operation 100 has been described in terms of restructuring an entire DEDB, it will be recognized that DEDBs are comprised of areas and that one or more such areas may be restructured without restructuring the entire DEDB. Accordingly, actions in accordance with FIG. 1 are applicable to both entire DEDBs and less than entire DEDBs. If the update is directed to an area of the database that is not being restructured (the "NO" prong of block 210), no further processing is needed and the change capture module exits. If the update is directed to an area of source database 110 that is being restructured (the "YES" prong of block 210), yet another check is made to determine if the update completes a transaction, that is, is the update a COMMIT command (block 215).

If the update does not complete a transaction (the "NO" prong of block 215), the update is recorded (block 220) whereafter the change capture module exits. If the update completes a transaction (the "YES" prong of block 215), yet another check is made to determine if the update is directed to an area of source database 110 that has already been processed in accordance with block 130 of FIG. 1 (block 225).

Figure 3A:
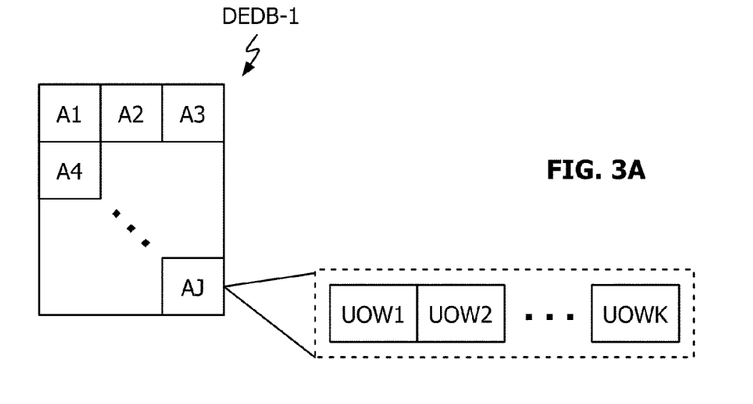
FIGS. 3A-3C show the internal structure of an illustrative IMS database.
Figure 3B:
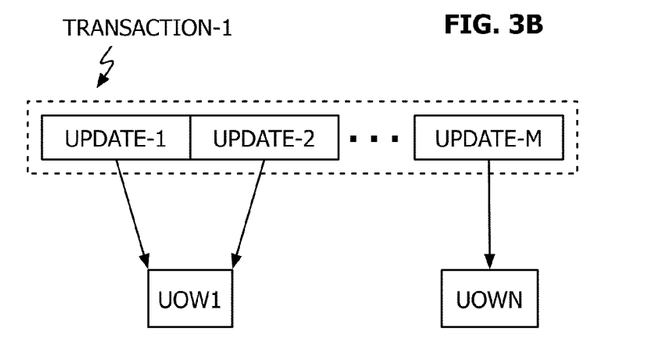
Figure 3C:
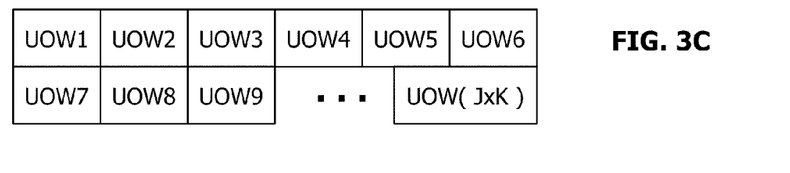

Referring to FIG. 3A, a DEDB (e.g., DEDB-1), as previously noted, may be comprised of a series of areas (e.g., A1→AJ), each of which may be comprised of a series of UOWs (e.g., UOW1→UOWK). In the context of an IMS database, a UOW is a region that is wholly contained within a specified number of storage blocks and which is independent of any other UOW or area within a DEDB. Referring now to 3B, an IMS transaction may comprise a series of one or more updates (e.g., update-1→update-M) where each update may effect changes to one or more UOWs (e.g., UOW1 and UOWN). Because a DEDB may be comprised on a sequence of areas which, themselves, may be comprised of a sequence of UOWs, a DEDB may be thought of as comprising a single sequence of UOWs as illustrated in FIG. 3C: beginning with the first UOW in the first area (e.g., UOW1 from A1) and ending with the last UOW from the last area (e.g., UOWK from AJ, making a total of (J×K) UOWs).

Referring again to FIG. 2, with respect to block 225, offline restructure operation 100 may load data from source database 110 into shadow database 115 one UOW at a time, beginning with the source database's first UOW in the first area and ending with the source database's last UOW from the last area. If restructure operation 100 communicates to change capture module (via acts in accordance with block 125) that it is currently populating shadow database 115 with UOWx from source database 110 via status message 230, any update associated with any UOW after UOWx would not be "behind" (the "NO" prong of block 225), and may be safely ignored. One reason this may be done is that if the UOW that triggered operations in accordance with block 125 is not behind the UOW being currently copied into shadow database 115, it will be captured when the UOW(s) to which it is directed is copied. On the other hand, if the update that triggered acts in accordance with block 125 is associated with a UOW that is behind the current UOW being copied into shadow database 115—that is, directed to a source UOW that has already been copied into shadow database 115 (the "YES" prong of block 225), all of the updates comprising the transaction may be sent to restructure operation 100 (block 235). In another embodiment, acts in accordance with block 135 may only send those updates that are associated with UOWs that are "behind" the UOW being currently copied into shadow database 115. (Recall, from above and FIG. 3, a single transaction may comprise updates that modify multiple UOWs; some of which may be "behind" the UOW currently being copied and some may be "ahead." Those UOWs "ahead" need not be processed immediately.)

Figure 4:
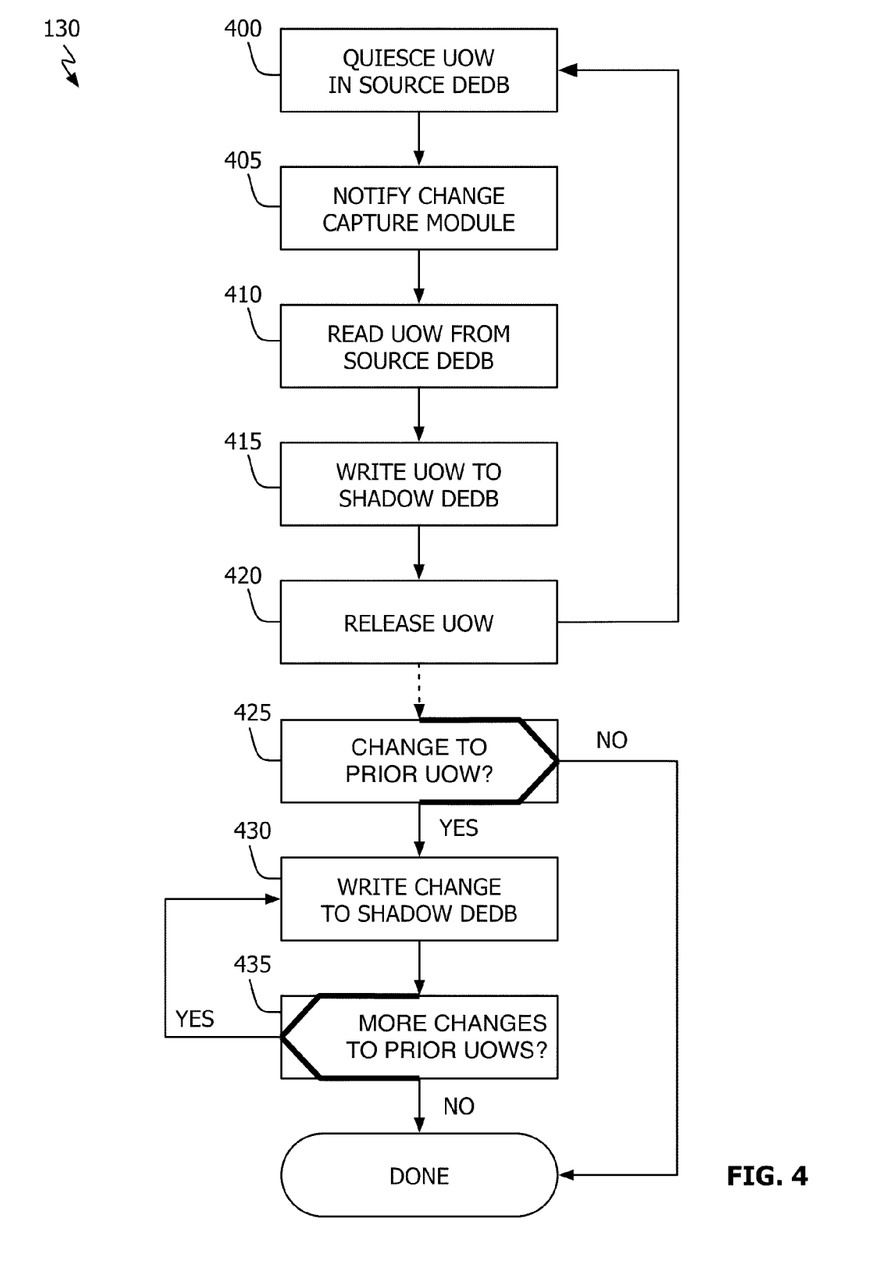
FIG. 4 shows, in flowchart form, a shadow database population operation in accordance with one embodiment of the invention.

Referring to FIG. 4, acts in accordance with block 130 begin by specifying and quiescing a first UOW in source database 110 (block 400) and notifying the change capture module that shadow database 115 is being populated with data from the specified UOW (block 405)—represented in FIG. 1 as a dashed directed line from block 130 to block 125. As used herein, the act of quiescing a UOW means to halt future updates to the UOW and allowing all in-flight transactions against the UOW to complete. Once quiesced, the UOW is read from source database 110 (block 410) and written into shadow database 115 (block 415), after which the source database's UOW is released (block 420). Following acts in accordance with block 420, another source UOW is obtained (if available) as shown by the line from block 420 to block 400.

In addition, and asynchronous to operations in accordance with blocks 400-420, a check is made to determine if a source database UOW that had previously been copied (i.e., during acts in accordance with block 400-420) has been modified (block 425). The asynchronous nature of this operation is indicated by the dashed directed line from block 420 to block 425. If no prior copied UOWs have been modified (the "NO" prong of block 425), no updates need to be applied to shadow database 115. If at lest one prior copied UOW has been modified (the "YES" prong of block 425), the modification(s) is written to shadow database 115 (block 430). Another check is then made to determine if there are any other prior copied UOWs that have been modified (block 435). If there are (the "YES" prong of block 435), those modifications too are written to shadow database 115. If no prior copied UOWs have been modified (the "NO" prong of block 435), no updates need to be applied to shadow database 115.

Figure 5:
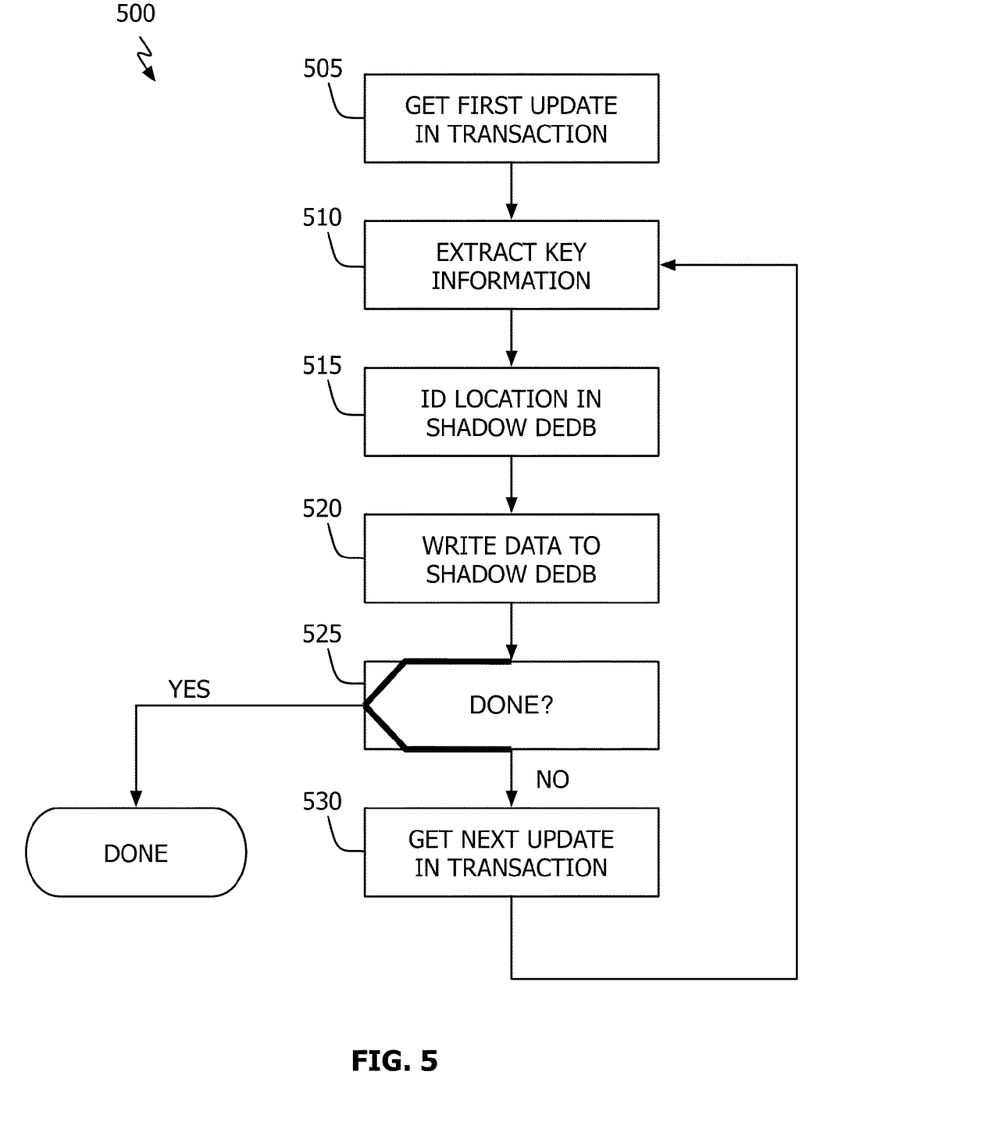
FIG. 5 shows, in flowchart form, a transaction update operation in accordance with one embodiment of the invention.

Modifications to shadow database 115 in accordance with block 430 are made one update at a time. Recall from above, when a modification is sent to offline restructure operation 100 by an update module, it is in the form of a transaction. A transaction, in turn, is comprised of one or more updates (see FIG. 3B). In one embodiment of the invention, modifications to prior copied UOWs may be processed one transaction at a time as shown in FIG. 5. Illustrative transaction update operation 500 begins by selecting the first update operation in the transaction (block 505). The key associated with the update is then extracted (block 510) and, based on that key, a location at which the updated data is to be stored in shadow database 115 is determined (block 515). As an initial matter, it will be recognized that an "update" identifies a datum within source database 110 that is to be modified, the operation to be performed (e.g., insert a new segment, replace or modify a segment, or delete a segment), the data for the specified operation and, perhaps, other elements not necessary for this discussion. It will also be recognized that the datum is identified by a key (sometimes referred to as a concatenated key) that uniquely identifies where within source database 110 the datum (e.g., node) being updated is located. In one embodiment, the root portion of the key may be used to identify which area and UOW within shadow database 115 that the update is to be applied to; the remaining portion of the key may be used to determine where, within the identified UOW, the update is to be applied. It will be recognized that this approach to mapping data from online DEDB database 110 to offline DEDB database 115 requires that the two databases use the same key structure.

Once the key for the datum being updated has been obtained in accordance with block 510, the key may be applied to a randomizer for shadow database 115. As well be known to those of ordinary skill in the IMS field, randomizing routines determine the location of database records by area within a DEDB and by root anchor point (RAP) within the area. From the randomizer, the unique location in shadow database 115 corresponding to the datum that was updated in source database 110 is identified. This location is used to write data into shadow database 115 (block 520). If additional updates remain to be processed in the current transaction (the "NO" prong of block 525), the next update is obtained (block 530) whereafter operations continue at block 510. If no remaining updates remain to be processed (the "YES" prong of block 525), transaction update operation 500 is complete.

Illustrative insert, replace/update and delete operations in accordance with the invention are set forth in Tables 1 through 3 respectively.

TABLE 1

Illustrative Insert into Shadow Database Operation

Insert( SRC_KEY, DATUM )
{ Identify area in shadow database 115 ( SRC_KEY )
  Read identified shadow database area
  If sufficient free space exists
  {
    Write DATUM into free space
  }
  Else
  {

TABLE 1-continued

Illustrative Insert into Shadow Database Operation

```
    Find needed free space in shadow database 115
        in accordance with IMS practice
        Write DATUM into free space
    }
    Update shadow database to reflect write operation
}
```

TABLE 2

Illustrative Replace/Update into Shadow Database Operation

```
Replace( SRC_KEY, DATUM )
{   Identify area in shadow database 115 ( SRC KEY )
    Read keys from identified shadow database area until the
        segment having the identified key is found (source key as
        transformed by the shadow database's randomizer function)
    If replacement segment for DATUM is smaller than
        original segment
    {   Replace old segment with DATUM
        Mark unused space as "free"
    }
    Else if replacement segment for DATUM is same size as
        original segment
    {
        Replace old segment with DATUM
    }
    Else // segment for DATUM is larger than original segment
    {
        Find necessary free space in shadow database 115
        Mark original segment as "free"
        Write old segment with new DATUM at newly found location
    }
    Mark segment as modified
}
```

TABLE 3

Illustrative Replace/Update into Shadow Database Operation

```
Delete( SRC KEY )
{
    Identify segment in shadow database 115 ( SRC KEY )
    Mark identified segment and all child segments as deleted
    Mark deleted segment(s) as "free"
}
```

With respect to those operations in which storage areas within shadow database 115 are marked as "free," it will be recognized that in current IMS implementations each free space element must be at least 4 bytes long. All freed storage less than 4 bytes is generally marked as "scrap." Individual scrap elements may be reclaimed during, for example, reorganization or defragment operations.

Figure 6:
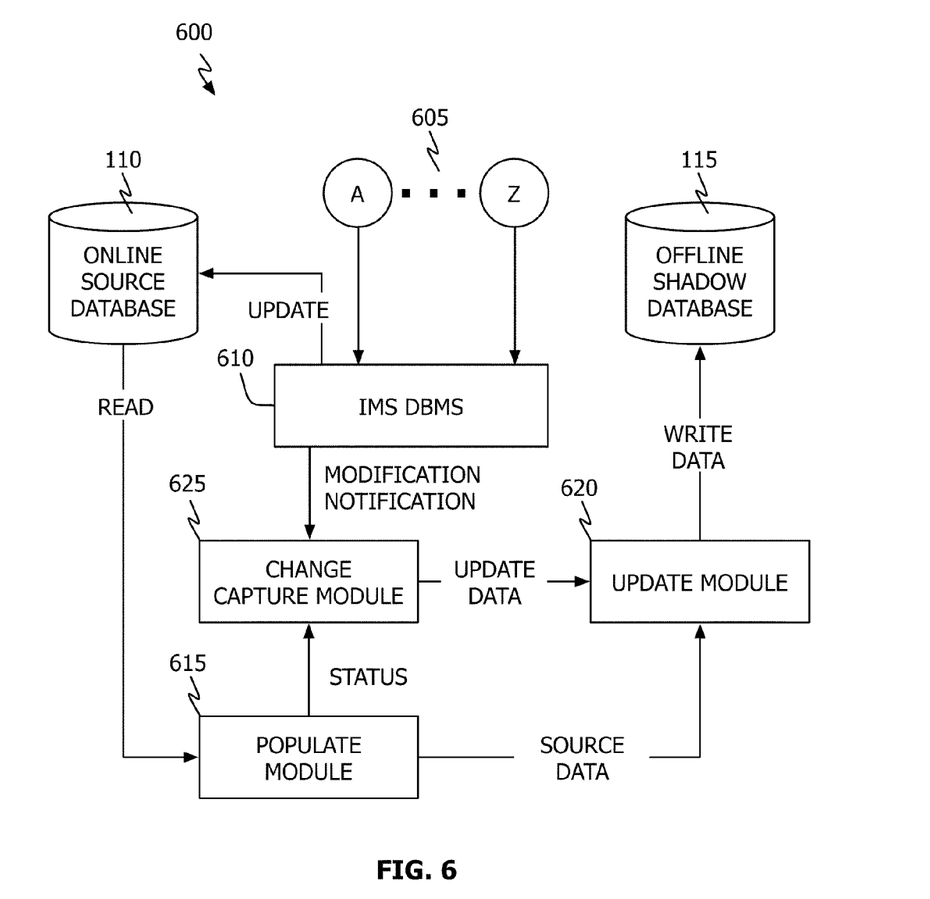
FIG. 6 shows, in block diagram form, a functional model of one system for implementing an offline restructure operation in accordance with one embodiment of the invention.

Referring to FIG. 6, in one embodiment acts in accordance with FIGS. 1, 2, 4 and 5 may be performed by system 600 comprising a plurality of interconnected functional modules. As shown, system 600 comprises applications 605 (e.g., applications A to Z) that interact with DBMS 610 to update source DEDB database 110. Populate module 615 reads data from source database 110 (see FIG. 1 at block 130 and FIG. 4) and sends that data to update module 620 (see FIG. 1 at block 130 and FIGS. 4 and 5) and status notification to change capture module 625 (see FIG. 1 at block 125 and FIG. 2). Update module 620 uses source data provided by populate module 615 and update data provided by change capture module 625 to write data into shadow database 115.

Figure 7:
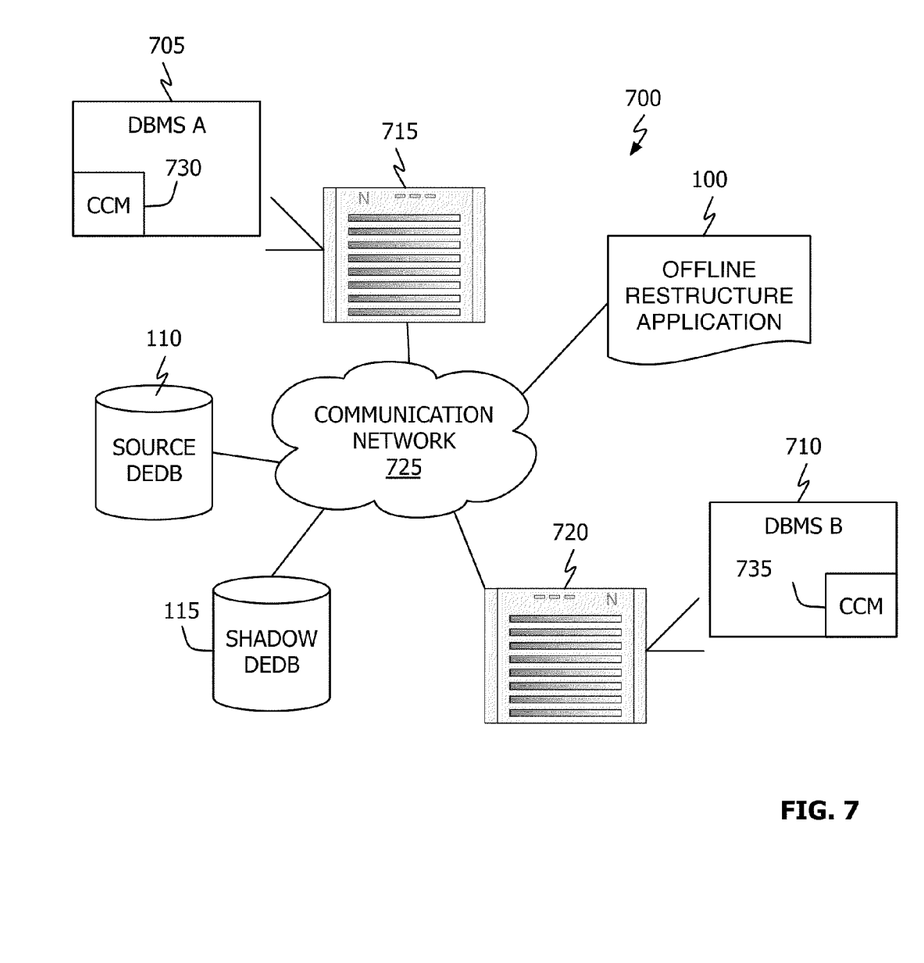
FIG. 7 shows, in block diagram form, a computational environment in which operations in accordance with the invention may operate.

As noted above and illustrated in FIG. 7, offline restructure operation 100 may execute in environment 700 having multiple IMS DBMS' (e.g., 705 and 710), executing on separate computer systems (e.g., 715 and 720), all of which communicate through a communications network (e.g., 725). As shown, each DBMS has a change capture module (e.g., 730 and 735). As shown, source database 110 and shadow database 115 may also be interconnected through network 725, although this is not necessary. For example, shadow database 115 may be directly coupled to offline restructure operation 100. Accordingly, FIG. 7 should be viewed as a functional interconnectivity diagram and not as a requirement that each described element (e.g., shadow database 115 and computer system 715) be physically distinct. In one system in accordance with FIG. 7, offline restructure application 100 and all DBMS' that may update source database 110 (e.g., DBMS' 705 and 710) are members of a common IMSPlex. As such, any time one DBMS updates source database 110, each member of the IMSPlex is so notified. Further, if a new DBMS enters the IMSPlex, or an existing DBMS leaves the IMSPlex, offline restructure application may be so notified.

Various changes in the components as well as in the details of the illustrated operational methods are possible without departing from the scope of the following claims. For instance, in the illustrative system of FIG. 7, each DBMS may execute on a separate computer system or a given computer system may support multiple DBMS'. Further, network 725 may comprise one or more wide area networks (WANs) and/or one or more local area networks (LANs) and use any suitable technology (e.g., wired or unwired) and protocol (e.g., TCP and IBM's SNA) now known or later developed.

In addition, acts in accordance with FIGS. 1, 2, 4, 5 and 6 may be performed by one or more programmable control devices executing instructions organized into one or more modules (colloquially referred to as programs or applications). As a program(s), offline restructure operation 100 may utilize threads to control various aspects of the described process. For example, the change capture function (e.g., 625) may initiate a thread whenever a COMMIT operation is detected (e.g., from DBMS 610). Similarly, input/output programming that fetches content for shadow database 115 may implement contention mechanisms. By way of example, if a second thread seeks access to block A of shadow database 115 while a first thread is accessing block A, the second thread may block until the first thread completes.

To prevent the situation in which existing applications fail because of database restructuring (e.g., applications 605), some embodiments in accordance with the invention may prohibit such change. Examples of these types of changes include, but are not limited to: changes in key length; the removal of a segment (in some circumstances); changing a non-key segment to a key segment or visa versa; decreasing a database's maximum segment size; and increasing a database's minimum segment size.

The aforementioned programmable control devices may comprise a single computer processor, a special purpose processor, a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices, but exclude transitory propagating signals.

The invention claimed is:

1. A computer programmed to perform an offline data entry database (DEDB) restructure operation, the operation comprising:
   identifying an online source DEDB having a first structure;
   identifying an offline shadow DEDB having a second structure that differs from the first structure;
   registering one or more areas of the source DEDB with a change capture module prior to copying data from the source DEDB to the offline shadow DEDB, an area comprising a specified number of units of work (UOWs), a UOW being a region contained in a specified number of storage blocks;
   copying data from the one or more registered areas of the source DEDB into the offline shadow DEDB in units of work, wherein the copying of each unit of work (UOW) occurs sequentially so that copying begins after the preceding UOW has been written to the offline shadow DEDB;
   identifying a modification to the source DEDB occurring during the act of copying;
   determining whether the modification is directed to a registered area;
   applying the modification to the offline shadow DEDB while keeping the source DEDB online;
   quiesceing the source DEDB;
   taking the source DEDB offline;
   applying any additional modifications made to the source DEDB that have not been applied to the offline shadow DEDB;
   swapping the offline shadow DEDB for the source DEDB; and
   putting the offline shadow DEDB online, wherein the offline shadow DEDB replaces the source DEDB as an online DEDB.

2. The computer of claim 1, wherein identifying the offline shadow DEDB comprises:
   defining the second structure; and
   allocating the offline shadow DEDB.

3. The computer of claim 1, wherein the areas registered represent less than the entire source DEDB.

4. The computer of claim 1, the operation further comprising:
   determining whether a sufficiently small number of modifications await to be applied to the offline shadow DEDB; and
   performing the quiescing, the applying, the, and
      putting the offline shadow DEDB online when it is determined that a sufficiently small number of modifications await to be applied to the offline shadow DEDB.

5. The computer of claim 1, wherein the program to perform the offline DEDB restructure operation comprises a member of an IMSPlex.

6. The computer of claim 1, wherein copying data from the source DEDB into the offline shadow DEDB comprises:
   quiescing a first unit of work (UOW) in the source DEDB;
   notifying the change capture module that the first UOW has been copied to the offline shadow DEDB;
   reading the first UOW from the source DEDB at a first time;
   writing the first UOW into the offline shadow DEDB; and
   releasing the first UOW so that it may be updated in the source DEDB.

7. The computer of claim 6, wherein applying the identified modifications comprises incorporating, into the offline shadow DEDB, at least one modification to a second UOW in the source DEDB, wherein the second UOW was copied into the offline shadow DEDB before the first time.

8. The computer of claim 6, wherein the modification is to a second source DEDB UOW, and wherein
   the second source DEDB UOW was copied into the offline shadow DEDB at a second time,
   the second time occurring before the first time, and
   the modification to the second source DEDB UOW occurring after the second time and before the first time.

9. The computer of claim 8, wherein applying the modification comprises:
   identifying a first update portion of the modification to the second source DEDB UOW, the first update portion comprising a key and content;
   extracting the key;
   identifying a location within the offline shadow DEDB based on application of a randomizer function to the extracted key; and
   writing the content into the offline shadow DEDB at the identified location.

10. A program storage device comprising instructions for causing a programmable control device to perform the offline data entry database (DEDB) restructure operation of claim 1.

11. The program storage device of claim 10, wherein the instructions for causing the programmable control device to perform the act of copying comprises instructions for causing the programmable control device to:
    quiesce a first unit of work (UOW) in the source DEDB;
    read the first UOW from the source DEDB at a first time;
    write the first UOW into the offline shadow DEDB; and
    release the first UOW so that it may be updated in the source DEDB.

12. The program storage device of claim 11, wherein the instructions for causing the programmable control device to perform the act of identifying modifications to the source DEDB comprises instructions for causing the programmable control device to identify a modification to a second source DEDB UOW, wherein:
    the second source DEDB UOW was copied into the offline shadow DEDB at a second time,
    the second time occurring before the first time, and
    the modification to the second source DEDB UOW occurring after the second time and before the first time.

13. A networked computer system comprising a plurality of computers communicatively coupled, at least one of the plurality of computers programmed to perform at least a portion of the offline data entry database (DEDB) restructure operation of claim 1, wherein the entire offline data entry database (DEDB) restructure operation of claim 1 is performed collectively by the plurality of computers.

14. A computer system comprising:
    a first storage device having stored therein an online source data entry database (DEDB) having a first structure;
    a database management system (DBMS) communicatively coupled to the first storage device, wherein the DBMS is configured to modify the source DEDB;
    a second storage device having stored therein an offline shadow DEDB having a second structure that differs from the first structure;
    at least one processor; and
    a memory storing instructions that, when executed by at least one processor, cause the computer system to perform operations comprising:
       registering one or more areas of the source DEDB with a change capture module prior to reading content from the source DEDB in units of work, reading content from the one or more areas of source DEDB in units of work, wherein a unit of work (UOW) is a region contained in a specified number of storage blocks and wherein a specified number of UOWs comprise an area of the source DEDB;

receiving notification of modifications to the source DEDB from the DBMS;

writing data to the offline shadow DEDB based on the source DEDB content and the modifications to the source DEDB, wherein the modifications are applied to the offline shadow DEDB when the modifications are directed to the one or more areas registered with the change capture module;

quiesceinq the source DEDB;

taking the source DEDB offline;

applying any additional modifications made to the source DEDB that have not been applied to the offline shadow DEDB;

swapping the offline shadow DEDB for the source DEDB; and putting the offline shadow DEDB online, wherein the offline shadow DEDB replaces the source DEDB as an online DEDB.

15. The computer system of claim 14, wherein the computer system includes an IMSPlex, where the DBMS is associated with a first computing device of the computer system and the computer system further includes a second DBMS communicatively coupled to the source DEDB and associated with a second computing device.

16. The computer system of claim 15, wherein receiving notification of modifications to the source DEDB further includes receiving notification of modifications to the source DEDB by the second DBMS.

17. The computer system of claim 14, wherein writing data to the offline shadow DEDB based on the source DEDB content comprises:

quiescing a first unit of work (UOW) in the source DEDB;

notifying the change capture module that the first UOW has been copied to the offline shadow DEDB;

reading the first UOW from the source DEDB;

writing the first UOW into the offline shadow DEDB; and releasing the first UOW so that it may be updated in the source DEDB.

18. The computer system of claim 17, wherein writing data to the offline shadow DEDB based on the source DEDB content and the modifications comprises:

receiving a modification to a second source DEDB UOW;

determining, using the change capture module, whether the second source DEDB UOW has been copied to the offline shadow DEDB;

ignoring the update when the second source DEDB UOW has not been copied to the offline shadow DEDB; and applying the modification to a UOW of the offline shadow DEDB when the second source DEDB UOW has been copied to the offline shadow DEDB.

19. The computer system of claim 14, wherein applying a modification to the offline shadow DEDB comprises:

extracting a key from an update portion of the modification;

applying the key to a randomizer function for the offline shadow DEDB to determine a unique location in the offline shadow DEDB; and writing the modification to the unique location.

20. The computer system of claim 14, wherein the first structure differs from the second structure in a randomizer function used by the database, the randomizer function selecting an area of the DEDB and a root anchor point (RAP) within the area as a location for a database record.

* * * * *

UNITED STATES PATENT AND TRADEMARK OFFICE
CERTIFICATE OF CORRECTION

PATENT NO. : 8,700,566 B2  
APPLICATION NO. : 12/563637  
DATED : April 15, 2014  
INVENTOR(S) : Larry J. Bristol et al.

It is certified that error appears in the above-identified patent and that said Letters Patent is hereby corrected as shown below:

In the Claims

In column 9, line 49, In Claim 4, delete "the," and insert --the swapping,--, therefor.

Signed and Sealed this
Seventeenth Day of June, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,700,566 B2 | Page 1 of 1 |
| APPLICATION NO. | : 12/563637 | |
| DATED | : April 15, 2014 | |
| INVENTOR(S) | : Larry J. Bristol et al. | |

It is certified that error appears in the above-identified patent and that said Letters Patent is hereby corrected as shown below:

In the Claims:

In column 9, line 28, In Claim 1, delete "quiesceing" and insert --quiescing--, therefor.

In column 11, line 14, In Claim 14, delete "quiesceinq" and insert --quiescing--, therefor.

Signed and Sealed this
Second Day of September, 2014

Michelle K. Lee
*Deputy Director of the United States Patent and Trademark Office*